US012809459B2

(12) United States Patent
Timonen et al.

(10) Patent No.: US 12,809,459 B2
(45) Date of Patent: Nov. 24, 2026

(54) NOISE REDUCTION DURING EYE TRACKING IN ADAPTIVE EYEGLASSES

(71) Applicant: Pixieray Oy, Espoo (FI)

(72) Inventors: Juha Timonen, Kauniainen (FI); Timo Auranen, Tampere (FI)

(73) Assignee: Pixieray Oy, Espoo (FI)

( * ) Notice: Subject to any disclaimer, the term of this patent is extended or adjusted under 35 U.S.C. 154(b) by 199 days.

(21) Appl. No.: 19/010,959

(22) Filed: Jan. 6, 2025

(65) Prior Publication Data

US 2025/0251789 A1 Aug. 7, 2025

(30) Foreign Application Priority Data

Feb. 5, 2024 (FI) ..................................... 20245117

(51) Int. Cl.

| | |
|---|---|
| ***G06F 3/01*** | (2006.01) |
| ***G01J 1/42*** | (2006.01) |
| ***G01K 3/00*** | (2006.01) |
| ***G02C 7/02*** | (2006.01) |

(52) U.S. Cl.

CPC ............ *G06F 3/013* (2013.01); *G01J 1/4204* (2013.01); *G01J 1/429* (2013.01); *G01K 3/005* (2013.01); *G02C 7/02* (2013.01)

(58) Field of Classification Search

CPC ......... G06F 3/013; G01J 1/4204; G01J 1/429; G01K 3/005; G02C 7/02

See application file for complete search history.

(56) References Cited

U.S. PATENT DOCUMENTS 6,963,626 B1 * 11/2005 Shaeffer ................... H04B 1/30 455/343.1
2018/0184002 A1 6/2018 Thukral et al.
2018/0299953 A1 10/2018 Selker et al.
2022/0052603 A1 * 2/2022 Yelamos Ruiz .... H02M 1/0009
2023/0185369 A1 * 6/2023 Russell .............. G02B 27/0172 345/156

FOREIGN PATENT DOCUMENTS

WO 2022020434 A1 1/2022
WO 2023152419 A1 8/2023

OTHER PUBLICATIONS

European Patent Office, Extended European Search Report, Application No. 25152530.9-1218, Mailed Jul. 3, 2025, 5 pages.
Finnish Patent and Registration Office, Search Report, Application No. 20245117, Mailed Apr. 30, 2024, 2 pages.

* cited by examiner

*Primary Examiner* — Gary Collins

(74) *Attorney, Agent, or Firm* — Ziegler IP Law Group, LLC.

(57) ABSTRACT

A tracking system for an adaptive eyeglass includes a left eye-tracker, a right eye-tracker, left auxiliary sensor(s), right auxiliary sensor(s), a processor, a left communication bus communicably coupling the processor to the left auxiliary sensor(s), and a right communication bus communicably coupling the processor to the right auxiliary sensor(s). Communication between the left auxiliary sensor(s) and the left communication bus is temporarily disabled, whilst sampling left eye-tracking data using the left eye-tracker. Communication between the right auxiliary sensor(s) and the right communication bus is temporarily disabled, whilst sampling right eye-tracking data using the right eye-tracker.

14 Claims, 3 Drawing Sheets

NOISE REDUCTION DURING EYE TRACKING IN ADAPTIVE EYEGLASSES

TECHNICAL FIELD

The present disclosure relates to tracking systems for adaptive eyeglasses. Moreover, the present disclosure relates to methods implemented by such tracking systems.

BACKGROUND

Adaptive eyeglasses typically facilitate autofocus based on eye-tracking of a user's eyes. Such eye-tracking is often performed by emitting infrared (IR) light towards a given eye using one or more IR emitters and sampling IR signals representative of an intensity of the IR light (reflected off from the given eye) sensed using one or more IR sensors. As these IR signals are quite tiny (for example, could be more than 100 dB lower than the IR light emitted by the IR emitters), the eye-tracking so performed is very noise sensitive. Moreover, the IR signals are sampled (namely, measured and collected) using an analogue front end (AFE), which is very sensitive to power supply noise and any signal coupling caused by an adjacent circuit operation (for example, other peripheral circuits related to other sensors in the adaptive eyeglasses).

FIG. 1 depicts a timing diagram of various different activities of a conventional tracking system that are performed for a given eye; FIG. 1 represents prior art. In the timing diagram, units of time are marked on an x-axis. Activities of an eye-tracker are depicted in a top portion, marked ET, while activities of at least one auxiliary sensor are depicted in a bottom portion, marked Aux. As shown, a read-out from the at least one auxiliary sensor causes noise to IR signals that are being sampled by the eye-tracker.

The aforementioned problem of noise sensitivity is alleviated with a highly-integrated design of the adaptive eyeglasses, which increases unwanted signal-to-signal coupling and high impedance. Furthermore, small capacity batteries that are employed in the adaptive eyeglasses limit a light power of the IR light emitted by the IR emitters. Notably, even small loads can cause power rails to fluctuate, when the IR emitters or other peripheral circuits are powered.

In an attempt to solve the aforementioned problem, one conventional technique involves increasing local filtering, capacitance to signal and power rails, thereby leading to reduction in fluctuation and hence the noise. However, this approach is not feasible for highly-integrated wearable devices (such as the adaptive eyeglasses) due to space constraints.

Another commonly-used conventional technique is to time slot all activities in a sequential manner. In a tracking system, such an approach can lead to a slow response of the tracking system, due to several reasons. Firstly, low-priority slow activities may remain pending, when higher-priority activities are being started. Implementing priority-based algorithms to speed up the overall operation of the adaptive eyeglasses might lead to a complex situation, where some low-priority activities are not performed at sufficiently fast intervals, due to higher-priority activities repeating too fast. Secondly, it could also consume more power, due to a need for a microcontroller unit (namely, a processor) to be kept active for longer periods of time.

Therefore, in light of the foregoing discussion, there exists a need to solve the aforementioned problem of noise sensitivity, whilst overcoming the aforementioned drawbacks associated with conventional techniques.

SUMMARY

The aim of the present disclosure is to provide a tracking system, and a method implemented by the tracking system that is capable of preventing noise sensitivity issues during eye-tracking. The aim of the present disclosure is achieved by tracking systems and methods as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
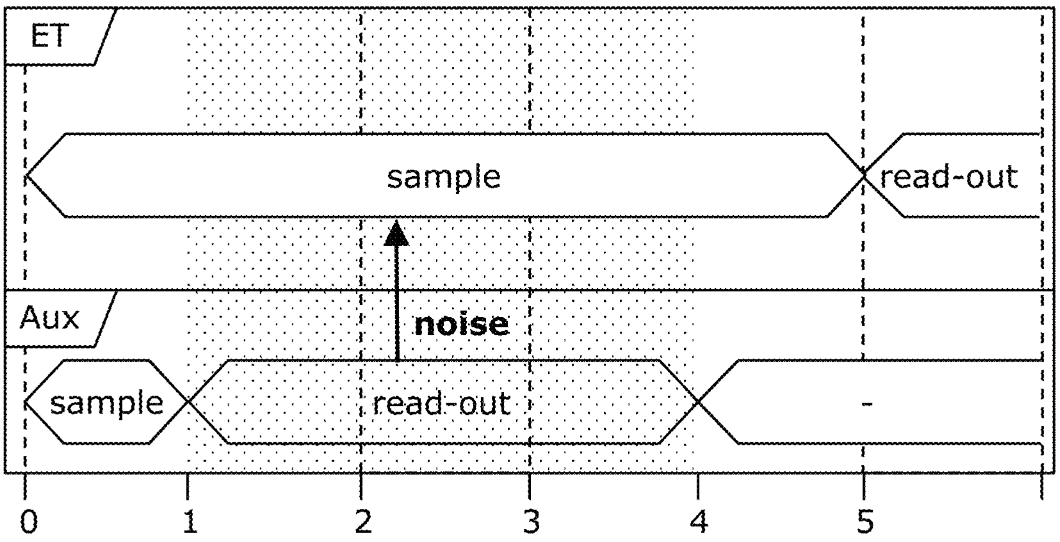
FIG. 1 (Prior Art)
FIG. 1 (Prior Art) depicts a timing diagram of various different activities of a conventional tracking system that are performed for a given eye.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a First Aspect, the Present Disclosure Provides a Tracking System for an Adaptive Eyeglass, the Tracking System Comprising:

- a left eye-tracker and a right eye-tracker for a left part and a right part of the adaptive eyeglass, respectively, wherein each of the left eye-tracker (204*a*, 304*a*) and the right eye-tracker (204*b*, 304*b*) comprises a plurality of light emitters, a plurality of light sensors and an analog front end (AFE) chip, wherein the plurality of light emitters are implemented as infrared (IR) emitters, while the plurality of light sensors are implemented as IR sensors;

at least one left auxiliary sensor and at least one right auxiliary sensor arranged on the left part and the right part, respectively, wherein the at least one left auxiliary sensor and the at least one right auxiliary sensor are peripheral sensors;

a processor;

a left communication bus that is employed to communicably couple the processor to the at least one left auxiliary sensor; and a right communication bus that is employed to communicably couple the processor to the at least one right auxiliary sensor, wherein the processor is configured to:

temporarily disable communication between the at least one left auxiliary sensor and the left communication bus, whilst sampling left eye-tracking data using the left eye-tracker; and temporarily disable communication between the at least one right auxiliary sensor and the right communication bus, whilst sampling right eye-tracking data using the right eye-tracker.

In a second aspect, the present disclosure provides a method implemented by a tracking system comprising a left eye-tracker and a right eye-tracker, at least one left auxiliary sensor and at least one right auxiliary sensor, a processor, a left communication bus communicably coupling the processor to the at least one left auxiliary sensor, and a right communication bus communicably coupling the processor to the at least one right auxiliary sensor, wherein each of the left eye-tracker and the right eye-tracker comprises a plurality of light emitters, a plurality of light sensors and an analog front end (AFE) chip, wherein the plurality of light emitters are implemented as infrared (IR) emitters, while the plurality of light sensors are implemented as IR sensors, and wherein the at least one left auxiliary sensor and the at least one right auxiliary sensor are peripheral sensors, the method comprising:

temporarily disabling communication between the at least one left auxiliary sensor and the left communication bus, whilst sampling left eye-tracking data using the left eye-tracker; and temporarily disabling communication between the at least one right auxiliary sensor and the right communication bus, whilst sampling right eye-tracking data using the right eye-tracker.

Pursuant to the present disclosure, the tracking system and the method are capable of preventing any noise sensitivity issues during sampling of the eye-tracking data. This technical benefit is achieved by temporarily disabling the communication between the auxiliary sensor(s) and the communication bus for a given eye, when the eye-tracking data is being sampled from the eye tracker for the given eye. This allows to time-multiplex various activities of the eye-tracker and the auxiliary sensor(s) of the given eye (namely, the same eye) in a very selective, yet effective manner. In other words, the activities of the auxiliary sensor(s) of the given eye need not be stalled completely, while the eye-tracker of the given eye is working (namely, either sampling or reading out). For example, reading-out of sensor data from the auxiliary sensor(s) of the given eye can be performed while the eye-tracker of the given eye is also reading out. This allows the tracking system and the method to work most efficiently (namely, without any delays), whilst facilitating highly accurate eye-tracking. Moreover, such a very selective manner of time-multiplexing between the eye-tracker and the auxiliary sensor(s) for the same eye works seamlessly and synchronously when performed for both the eyes. This will be evident from examples provided later in the present disclosure.

For purposes of the present disclosure, there will now be provided some implementation examples of various components of the tracking system. Herein, each eye-tracker (namely, the left eye-tracker and the right eye-tracker) comprises the plurality of light emitters and the plurality of light sensors. Notably, each eye-tracker comprising the plurality of light emitters and the plurality of light sensors enables the eye-tracking to be performed without requiring the eye-tracker to come in contact with a user's face. In some implementations, the plurality of light emitters are implemented as infrared (IR) emitters, while the plurality of light sensors are implemented as IR sensors. It will be appreciated that the IR light emitted from the IR emitters is invisible to the human eye and remains unaffected from visible light sources (for example, sunlight, room lighting, and the like) which enables to minimize noise levels in the signals received by the IR sensors. In other implementations, the plurality of light emitters can be implemented as ultraviolet (UV) emitters, while the plurality of light sensors can be implemented as UV sensors. In this regard, the UV emitters and the UV sensors may operate with UV light lying in a range of wavelengths that are not harmful to the human eye. For example, a wavelength of the UV light may lie in a range from 315 nanometres to 400 nanometres.

In some implementations, each eye-tracker could comprise an analog front end (AFE) chip that converts analog signals received from the plurality of light sensors to digital signals. In other implementations, each of the plurality of light sensors could have a built-in AFE functionality within itself. Notably, the use of the AFE chip in each eye-tracker enables to amplify and enhance the quality of the analog signals received from the plurality of light sensors.

Examples of the adaptive eyeglasses include, but are not limited to, a pair of glasses, a pair of sunglasses, and smart glasses. The term "auxiliary sensor" refers to any peripheral sensor that is communicably coupled to the processor with a communication bus. Notably, the at least one left auxiliary sensor and the at least one right auxiliary sensor being peripheral sensors implies that the at least one left auxiliary sensor and the at least one right auxiliary sensor are arranged in the adaptive eyeglass without affecting an aesthetic appearance of the adaptive eyeglass. The at least one auxiliary sensor can be implemented as various different types of sensors. As an example, the at least one auxiliary sensor could comprise a temperature sensor that is employed to sense an ambient temperature. As another example, the at least one auxiliary sensor could comprise a UV sensor. As yet another example, the at least one auxiliary sensor could be a charge level sensor that is employed to sense a charge level of at least one rechargeable power source of the tracking system. As still another example, the at least one auxiliary sensor could be an ambient light sensor. Optionally, in this regard, the tracking system further comprises the at least one rechargeable power source that is employed to supply electrical power to the left eye-tracker, the right eye-tracker, the at least one left auxiliary sensor, the at least one right auxiliary sensor and the processor.

The processor can be implemented as a microcontroller, a controller, or a microprocessor. As an example, the processor could be implemented as an application-specific integrated circuit (ASIC) chip, or a reduced instruction set computer (RISC) chip.

The left communication bus communicably coupling the processor to the at least one left auxiliary sensor can be implemented as an Inter-Integrated Circuit (I2C) bus. Similarly, the right communication bus communicably coupling the processor to the at least one right auxiliary sensor can also be implemented as an I2C bus. It will be appreciated that there may be several communication buses in the tracking system. In some implementations, the left eye-tracker and the right eye-tracker may be communicably coupled to the processor via different buses, namely Serial Peripheral Interface (SPI) buses.

Throughout the present disclosure, the term "sampling" refers to measuring or collecting sensor data from a given sensor. In case of an eye-tracker, the term "sampling" refers to measuring or collecting eye-tracking data from the eye-tracker. It is known that reading out the sensor data from the at least one auxiliary sensor during sampling of the eye-tracking data for the same eye leads to noise in the eye-tracking data. The present disclosure provides various ways in which such a situation can be prevented.

In an embodiment, the left eye-tracking data and the right eye-tracking data are sampled in a time-multiplexed manner. It will be appreciated that such a time-multiplexing for sampling the left eye-tracking data and the right eye-tracking data is performed in addition to the aforementioned very selective time-multiplexing of activities between the auxiliary sensor(s) and the eye-tracker of the same eye. This allows the tracking system and the method to work most efficiently (namely, without any delays), whilst facilitating highly accurate eye-tracking for both the eyes.

For this purpose, the tracking system is electrically designed to support operations of the left side and the right side independently. In other words, separate communication buses are employed to isolate sensitive power lines and sensitive signals from each other, thereby allowing a peripheral circuit operation of an opposite eye to work seamlessly during alternating left and right eye tracking.

The overall time-multiplexing between the left eye-tracker and the right eye-tracker, and between the eye-tracker and the auxiliary sensor(s) of the same eye can be performed in various different ways, depending on a scenario in which the tracking system is operating. For illustration purposes only, there will now be considered a few different scenarios, for example, based on a charge level of the at least one rechargeable power source of the tracking system, ambient conditions of the tracking system (including ambient light conditions and ambient temperature), and additional circuitry power consumption.

Optionally, the Processor is Configured to:

read out the left eye-tracking data from the left eye-tracker, during a time period when the right eye-tracking data is being sampled; and read out the right eye-tracking data from the right eye-tracker, during another time period when the left eye-tracking data is being sampled.

This may be a simplest way to time multiplex the sampling of the left eye-tracking data and the sampling of the right eye-tracking data, pursuant to the present disclosure. This can be used in combination with additional ways to time multiplex between the eye-tracker and the auxiliary sensor(s) of the same eye, to achieve the overall time-multiplexing between the left eye-tracker and the right eye-tracker, and between the eye-tracker and the auxiliary sensor(s) of the same eye can be performed.

Case 1: High/Medium Charge Level Condition

In a first embodiment, the processor is configured to:

detect when a charge level of the at least one rechargeable power source is above a first predefined threshold level; and when it is detected that the charge level is above the first predefined threshold level, read out left sensor data from the at least one left auxiliary sensor by allowing communication between the at least one left auxiliary sensor and the left communication bus, during a time period when the right eye-tracking data is being sampled; and read out right sensor data from the at least one right auxiliary sensor by allowing communication between the at least one right auxiliary sensor and the right communication bus, during another time period when the left eye-tracking data is being sampled.

In other words, the sensor data is read out from the auxiliary sensor(s) of the given eye when the eye-tracking data of another eye is being sampled. This does not cause any noise to the eye-tracking data of the other eye, because noise on the left communication bus does not affect the sampling of the right eye-tracking data (and vice versa).

Moreover, as the sampling of the eye-tracking data for the left eye and the right eye is performed in the time-multiplexed manner (as mentioned earlier), this also means that the sensor data of the auxiliary sensor(s) of the given eye is read out when the eye-tracking data of the same eye is not being sampled. In fact, the sensor data of the auxiliary sensor(s) of the given eye can be read out when the eye-tracking data of the same eye is being read out. Notably, any noise during the read-out phase of the eye-tracker for the given eye does not affect the eye-tracking data that has been already sampled for the given eye. As a result, there is no noise in the eye-tracking data of the given eye (namely, the same eye) also. One example implementation of the first embodiment has been illustrated in conjunction with FIG. 4.

It will be appreciated that the at least one rechargeable power source could comprise separate rechargeable power sources for a left side and a right side of the adaptive eyeglass. In such a case, the charge level of the at least one rechargeable power source could refer to an overall charge level of the separate rechargeable power sources.

The first predefined threshold level could be either system defined by default or user-defined. The first predefined threshold level may, for example, lie in a range of 40 percent to 80 percent; more optionally, in a range of 50 percent to 70 percent.

Case 2: Low Charge Level Condition

In a second embodiment, the processor is configured to:

detect when the charge level of the at least one rechargeable power source is any one of: (i) not above the first predefined threshold level, (ii) below a second predefined threshold level; and when it is detected that the charge level is any one of: (i) not above the first predefined threshold level, (ii) below the second predefined threshold level, read out left sensor data from the at least one left auxiliary sensor by allowing communication between the at least one left auxiliary sensor and the left communication bus, during every $M^{th}$ cycle of sampling of the right eye-tracking data, wherein M is an integer whose value is greater than or equal to 2; and read out right sensor data from the at least one right auxiliary sensor by allowing communication between the at least one right auxiliary sensor and the right communication bus, during every $N^{th}$ cycle of sampling of the left eye-tracking data, wherein N is an integer whose value is greater than or equal to 2.

This allows to reduce power consumption of the auxiliary sensor(s), thereby allowing the tracking system to utilise the remaining charge of the at least one rechargeable power source to focus on high priority tasks, such as eye-tracking. Moreover, by reducing the frequency of activities performed by the auxiliary sensor(s) and performing lesser number of activities in parallel, voltage fluctuations can be prevented during the low charge level condition.

In some implementations, there may be only one predefined threshold levels for the charge level, namely, the first predefined threshold level. In such implementations, the tracking system may be considered to have:

- a high charge level, when the charge level is above the first predefined threshold level; and
- a low charge level, when the charge level is not above the first predefined threshold level.

Accordingly, in such implementations, the charge level being (i) not above the first predefined threshold level corresponds to the low charge level.

In other implementations, there may be two separate predefined threshold levels for the charge level, namely, the first predefined threshold level and the second predefined threshold level, wherein the first predefined threshold level is higher than the second predefined threshold level. As an example, the first predefined threshold level could be 50 percent, while the second predefined threshold level could be 25 percent. In such implementations, the tracking system may be considered to have:

- a high charge level, when the charge level is above the first predefined threshold level;
- a medium charge level, when the charge level is not above the first predefined threshold level, but above the second predefined threshold level; and
- a low charge level, when the charge level is below the second predefined threshold level.

Accordingly, in such implementations, the charge level being (ii) below the second predefined threshold level corresponds to the low charge level.

Referring to the operation of "read out left sensor data from the at least one left auxiliary sensor by allowing communication between the at least one left auxiliary sensor and the left communication bus, during every $M^{th}$ cycle of sampling of the right eye-tracking data", if M were equal to 2, this would mean that the left sensor data would be read out during every $2^{nd}$ cycle of sampling of the right eye-tracking data. Moreover, it will be appreciated that for reading out the left sensor data in every $M^{th}$ cycle of sampling of the right eye-tracking data, the left sensor data could be sampled during every $M-1^{th}$ cycle of sampling of the right eye-tracking data. One example implementation of the second embodiment has been illustrated in conjunction with FIG. 5.

It will be appreciated that M and N can be much higher than 2, depending on how often the sensor data needs to be sampled. For example, in a case where the at least one auxiliary sensor comprises a charge level sensor and a temperature sensor, it may be preferred to read out the ambient temperature from the temperature sensor more often than reading out the charge level from the charge level sensor, when eye tracking is active. As an example, the charge level may be read out once every 5 seconds, which could mean that M for the charge level sensor is in an order of hundreds, for example 300 or more. Moreover, it will be appreciated that M and N can be different.

Case 3: Hot/Cold Ambient Condition

In a third embodiment, at least one of: the at least one left auxiliary sensor, the at least one right auxiliary sensor comprises a temperature sensor that is employed to sense an ambient temperature, and wherein the processor is configured to:

- detect when the ambient temperature is any one of: (i) more than a first predefined threshold temperature, (ii) below a second predefined threshold temperature; and
- when it is detected that the ambient temperature is any one of: (i) more than the first predefined threshold temperature, (ii) below the second predefined threshold temperature,
  - read out left sensor data from the at least one left auxiliary sensor by allowing communication between the at least one left auxiliary sensor and the left communication bus, during every $K^{th}$ cycle of sampling of the right eye-tracking data, wherein K is an integer whose value is greater than or equal to 2; and
  - read out right sensor data from the at least one right auxiliary sensor by allowing communication between the at least one right auxiliary sensor and the right communication bus, during every $L^{th}$ cycle of sampling of the left eye-tracking data, wherein L is an integer whose value is greater than or equal to 2.

This allows to reduce power consumption of the auxiliary sensor(s), thereby allowing the tracking system to utilise the remaining charge of the at least one rechargeable power source to focus on high priority tasks, such as eye-tracking, during the hot/cold ambient condition.

It will be appreciated that the ambient temperature being (i) more than the first predefined threshold temperature pertains to a hot ambient condition, while the ambient temperature being (ii) below the second predefined threshold temperature pertains to a cold ambient condition. As an example, the first predefined threshold temperature may lie in a range of 30 to 60 degree Celsius; more optionally, in a range of 40 to 50 degree Celsius. As another example, the second predefined threshold temperature may lie in a range of −10 to 5 degree Celsius; more optionally, in a range of −10 to 0 degree Celsius. It will be appreciated that the first predefined threshold temperature and the second predefined threshold temperature may be selected depending on a type of battery cell employed in the at least one rechargeable power source.

Moreover, it will be appreciated that K and L can be different.

It will also be appreciated that the hot/cold ambient condition (of Case 3) works quite similarly to the low charge level condition (of Case 2). This is because in the cold ambient condition, the tracking system behaves similar to the low charge level condition due to an increase in an internal impedance of the at least one rechargeable power source. In order to take this increase in the internal impedance into account, a voltage limit of the at least one rechargeable power source for the low charge level condition can be adjusted to be slightly higher in the cold ambient condition. In other words, parallel processing can be avoided at a higher battery voltage, in the cold ambient condition.

On the other hand, in the hot ambient condition, the internal impedance of the at least one rechargeable power source decreases, thereby reducing the noise during power-consuming tasks. However, this reduction in the noise is not very significant as compared to the overall noise that is experienced in the prior art due to parallel sampling of the eye-tracking data with reading out of the sensor data from the auxiliary sensor(s) for the same eye. Besides, current consumption of integrated circuits (namely, of the eye-tracker and the auxiliary sensor(s)) and the various communication buses increases in the hot ambient condition, thereby causing more noise coupling. As a result, the eye-tracker becomes less efficient in the hot ambient condition.

Therefore, in a scenario where both Case 2 and Case 3 are satisfied simultaneously, namely, the battery level is low and the ambient condition is hot or cold, the first predefined threshold level and/or the second predefined threshold level for the charge level can be modified. As an example, in very hot environments (for example, such as 45 degree Celsius or more), the first predefined threshold level and/or the second predefined threshold level can be decreased. As a result, the "low battery condition" would be satisfied sooner in the hot ambient condition, thereby enabling the tracking system to schedule and multiplex the various activities of the eye-tracker and the auxiliary sensor(s) for both the eyes optimally.

Case 4: Bright Outdoor Environment Condition

In a fourth embodiment, at least one of: the at least one left auxiliary sensor, the at least one right auxiliary sensor comprises a temperature sensor, and at least one of: the at least one left auxiliary sensor, the at least one right auxiliary sensor comprises at least one of: a UV sensor, an ambient light sensor, wherein a given eye-tracker comprises a plurality of light emitters and a plurality of light sensors, wherein the processor is configured to:

- detect at least one of: (i) when UV light intensities read out from the ultraviolet sensor are above a predefined threshold UV level, (ii) when an average illuminance read out from the ambient light sensor is above a predefined threshold illuminance; and
- when at least one of following is detected: (i) the UV light intensities are above the predefined threshold UV level, (ii) the average illuminance is above the predefined threshold illuminance,
  - increase an illumination intensity of each light emitter;
  - decrease a sampling frequency of the temperature sensor; and
  - increase a sampling frequency of the UV sensor.

When the UV light intensities are above the predefined threshold UV level, they could indicate a bright outdoor environment. The UV light intensities may be expressed in terms of the UV index (UVI). Accordingly, the predefined threshold UV level can also be defined in terms of UVI. Optionally, the predefined threshold UV level may lie in a range of 0.8 UVI to 1.2 UVI. As an example, the predefined threshold UV level may be 1 UVI; accordingly, a user of the adaptive eyeglass may be considered to be in a bright outdoor environment, when the UV light intensities read out from the ultraviolet sensor are above 1 UVI. It will be appreciated that typically, an indoor environment corresponds to a UV-index that is near zero.

Likewise, when the average illuminance is above the predefined threshold illuminance, it could indicate a bright outdoor environment. In a typical bright outdoor environment (namely, during daylight hours), the average illuminance may, for example, range from 10,000 lux to 100,000 lux or more. Accordingly, the predefined threshold illuminance may lie in a range of 5,000 lux to 10,000 lux.

It will be appreciated that using the ambient light sensor in combination with the UV sensor allows to improve the accuracy of detecting when the user is in a bright outdoor environment. This may be particularly beneficial when the UV sensor does not have a high accuracy.

In the bright outdoor environment condition, the illumination intensity of each light emitter is increased, thereby allowing the eye-tracker to sample the eye-tracking data more accurately. Notably, an increase in the ambient light level (which can be indicated by the UV light intensities read out from the ultraviolet sensor and/or by the average illuminance read out from the ambient light sensor) negatively impacts the accuracy of the light sensors; therefore, increasing the illumination intensity of the light emitters may allow to improve accuracy under such a condition. Optionally, the illumination intensity of a given light emitter is increased by a predefined percent that is selected based on the ultraviolet light intensities. As an example, the illumination intensity can be increased by percent.

Moreover, in the bright outdoor environment condition, the sampling frequency of the temperature sensor can be decreased, thereby allowing the tracking system to utilise the remaining charge of the at least one rechargeable power source for high priority tasks, namely, eye tracking and increasing the illumination intensity of the light emitters. As an example, the sampling frequency of the temperature sensor can be decreased by 50 percent. As another example, the sampling frequency of the temperature sensor can be decreased by 90 percent.

Furthermore, in the bright outdoor environment condition, the sampling frequency of the UV sensor can be increased, thereby allowing the tracking system to identify any changes in the bright outdoor environment condition promptly. This further allows the tracking system to schedule various activities of the auxiliary sensor(s) accordingly. As an example, the sampling frequency of the UV sensor can be increased by 50 percent. As another example, the sampling frequency of the UV sensor can be increased by 100 percent.

In this way, the tracking system is configured to prevent noise coupling from internal signalling, whilst balancing power rails. As is evident from the aforementioned Cases 1 to 4, the tracking system can be configured to take into account different sources impacting internally generated noise in the tracking system, including ambient conditions (namely, the UV light intensities and the ambient temperature), power source condition (namely, the charge level and aging) and peripheral circuitry power consumption (for example, Bluetooth communication, UV sensor(s), temperature sensor(s), memory, inertial measurement unit (IMU), and the like) to time slot and adjust the sampling frequency, speed and parallelism of the various activities of the tracking system, to minimize communication bus and power rail noise, during sensitive AFE operation.

The present disclosure also relates to the method of the second aspect as described above. Various embodiments and variants disclosed above, with respect to the tracking system of the aforementioned first aspect, apply mutatis mutandis to the method of the second aspect.

Optionally, the left eye-tracking data and the right eye-tracking data are sampled in a time-multiplexed manner.

Optionally, the method further comprises:

- reading out the left eye-tracking data from the left eye-tracker, during a time period when the right eye-tracking data is being sampled; and
- reading out the right eye-tracking data from the right eye-tracker, during another time period when the left eye-tracking data is being sampled.

In a first embodiment, the method further comprises:

- detecting when a charge level of the at least one rechargeable power source of the tracking system is above a first predefined threshold level; and
- when it is detected that the charge level is above the first predefined threshold level, reading out left sensor data from the at least one left auxiliary sensor by allowing communication between the at least one left auxiliary sensor and the left communication bus, during a time period when the right eye-tracking data is being sampled; and reading out right sensor data from the at least one right auxiliary sensor by allowing communication between the at least one right auxiliary sensor and the right communication bus, during another time period when the left eye-tracking data is being sampled.

In a second embodiment, the method further comprises:

detecting when a charge level of the at least one rechargeable power source of the tracking system is any one of: (i) not above a first predefined threshold level, (ii) below a second predefined threshold level; and when it is detected that the charge level is any one of: (i) not above the first predefined threshold level, (ii) below the second predefined threshold level, reading out left sensor data from the at least one left auxiliary sensor by allowing communication between the at least one left auxiliary sensor and the left communication bus, during every $M^{th}$ cycle of sampling of the right eye-tracking data, wherein M is an integer whose value is greater than or equal to 2; and reading out right sensor data from the at least one right auxiliary sensor by allowing communication between the at least one right auxiliary sensor and the right communication bus, during every $N^{th}$ cycle of sampling of the left eye-tracking data, wherein N is an integer whose value is greater than or equal to 2.

In a third embodiment, the method further comprises:

detecting when an ambient temperature of the tracking system is any one of: (i) more than a first predefined threshold temperature, (ii) below a second predefined threshold temperature; and when it is detected that the ambient temperature is any one of: (i) more than the first predefined threshold temperature, (ii) below the second predefined threshold temperature, reading out left sensor data from the at least one left auxiliary sensor by allowing communication between the at least one left auxiliary sensor and the left communication bus, during every $K^{th}$ cycle of sampling of the right eye-tracking data, wherein K is an integer whose value is greater than or equal to 2; and reading out right sensor data from the at least one right auxiliary sensor by allowing communication between the at least one right auxiliary sensor and the right communication bus, during every $L^{th}$ cycle of sampling of the left eye-tracking data, wherein L is an integer whose value is greater than or equal to 2.

In a fourth embodiment, a given eye-tracker comprises a plurality of light emitters and a plurality of light sensors, the method further comprising:

detecting at least one of: (i) when ultraviolet light intensities read out from an ultraviolet sensor of the tracking system are above a predefined threshold ultraviolet level, (ii) when an average illuminance read out from an ambient light sensor of the tracking system is above a predefined threshold illuminance; and when at least one of following is detected: (i) the ultraviolet light intensities are above the predefined threshold ultraviolet level, (ii) the average illuminance is above the predefined threshold illuminance, increasing an illumination intensity of each light emitter;

decreasing a sampling frequency of a temperature sensor of the tracking system; and increasing a sampling frequency of the ultraviolet sensor.

DETAILED DESCRIPTION OF THE DRAWINGS

Figure 2:
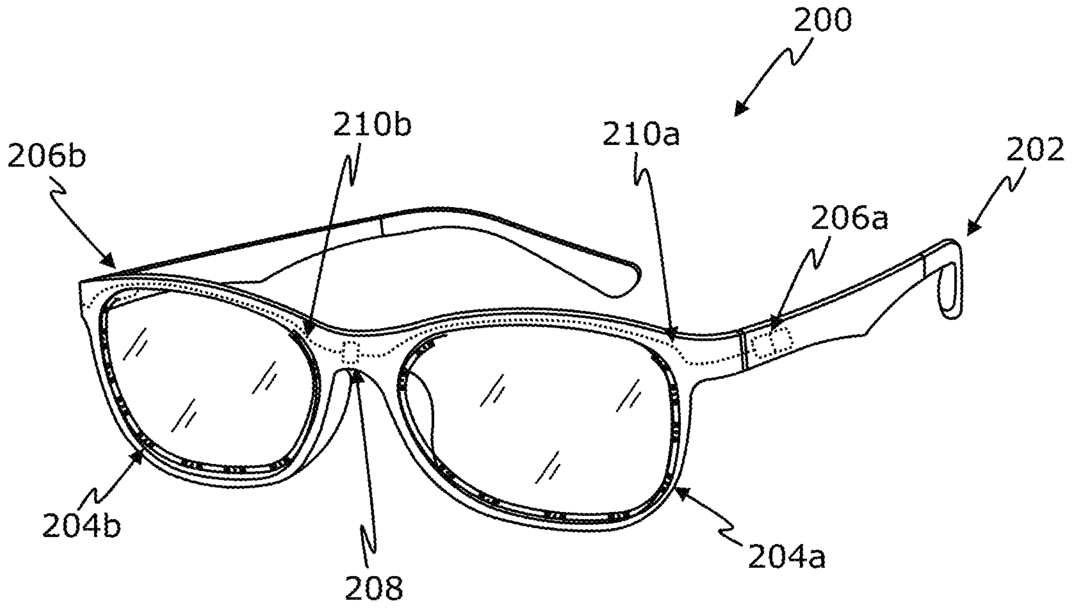
FIG. 2 is a schematic diagram of a tracking system for an adaptive eyeglass, in accordance with an embodiment of the present disclosure.

Referring to FIG. 2, there is illustrated a schematic diagram of a tracking system 200 for an adaptive eyeglass 202, in accordance with an embodiment of the present disclosure. The tracking system 200 comprises a left eye-tracker **204*a* and a right eye-tracker 204*b* for a left part and a right part of the adaptive eyeglass 202, respectively, wherein each of the left eye-tracker 204*a* and the right eye-tracker 204*b* comprises a plurality of light emitters, a plurality of light sensors and an analog front end (AFE) chip, wherein the plurality of light emitters are implemented as infrared (IR) emitters, while the plurality of light sensors are implemented as IR sensors; at least one left auxiliary sensor 206*a* and at least one right auxiliary sensor 206*b* arranged on the left part and the right part, respectively, wherein the at least one left auxiliary sensor 206*a* and the at least one right auxiliary sensor 206*b* are peripheral sensors; a processor 208; a left communication bus 210*a* that is employed to communicably couple the processor 208 to the at least one left auxiliary sensor 206*a*; and a right communication bus 210*b* that is employed to communicably couple the processor 208 to the at least one right auxiliary sensor 206*b*. As shown in FIG. 2, the left part and the right part of the adaptive eyeglass 202 correspond to a left eye and a right eye of a user, respectively, when the adaptive eyeglass 202** is worn by the user.

The processor 208 is configured to:

temporarily disable communication between the at least one left auxiliary sensor **206*a* and the left communication bus 210*a*, whilst sampling left eye-tracking data using the left eye-tracker 204*a*; and temporarily disable communication between the at least one right auxiliary sensor 206*b* and the right communication bus 210*b*, whilst sampling right eye-tracking data using the right eye-tracker 204*b***.

This prevents any noise sensitivity issues during sampling of the eye-tracking data.

Figure 3:
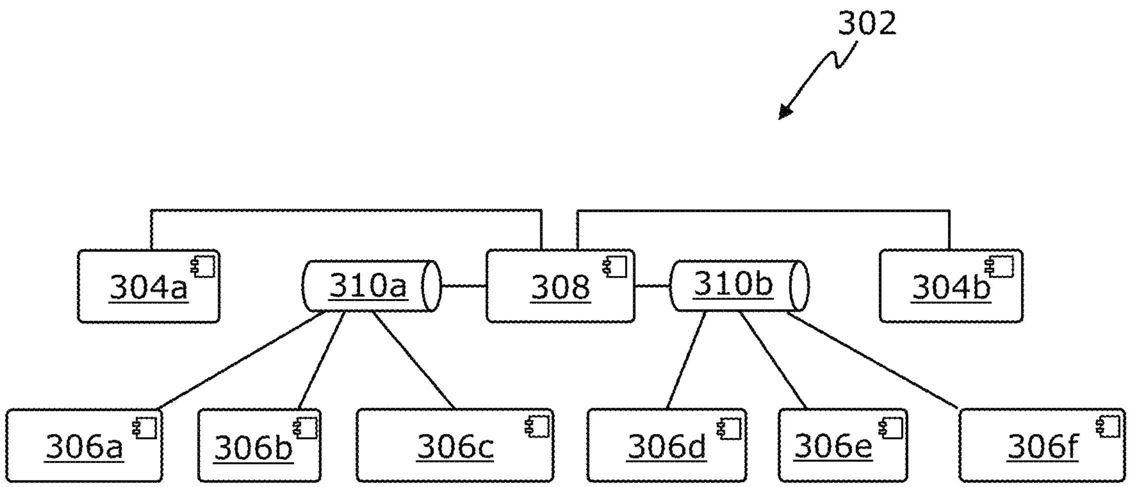
FIG. 3 is a block diagram of a tracking system for an adaptive eyeglass, in accordance with an embodiment of the present disclosure.

Referring to FIG. 3, there is illustrated a block diagram of a tracking system 302 for an adaptive eyeglass, in accordance with an embodiment of the present disclosure. The tracking system 302 comprises a left eye-tracker **304*a* and a right eye-tracker 304*b*; at least one left auxiliary sensor (depicted as auxiliary sensors 306*a-c*) and at least one right auxiliary sensor (depicted as auxiliary sensors 306*d-f*); a processor 308; a left communication bus 310*a* that is employed to communicably couple the processor 308 to the at least one left auxiliary sensor 306*a-c*; and a right communication bus 310*b* that is employed to communicably couple the processor 308 to the at least one right auxiliary sensor 306*d-f***.

The processor 308 is configured to:

temporarily disable communication between the at least one left auxiliary sensor **306*a-c* and the left communication bus 310*a*, whilst sampling left eye-tracking data using the left eye-tracker 304*a*; and temporarily disable communication between the at least one right auxiliary sensor 306*d-f* and the right communication bus 310***b*, whilst sampling right eye-tracking data using the right eye-tracker 304*b*.

This prevents any noise sensitivity issues during sampling of the eye-tracking data.

FIGS. 2 and 3 are merely examples, which should not unduly limit the scope of the claims herein. A person skilled in the art will recognize many variations, alternatives, and modifications of embodiments of the present disclosure.

Figure 4:
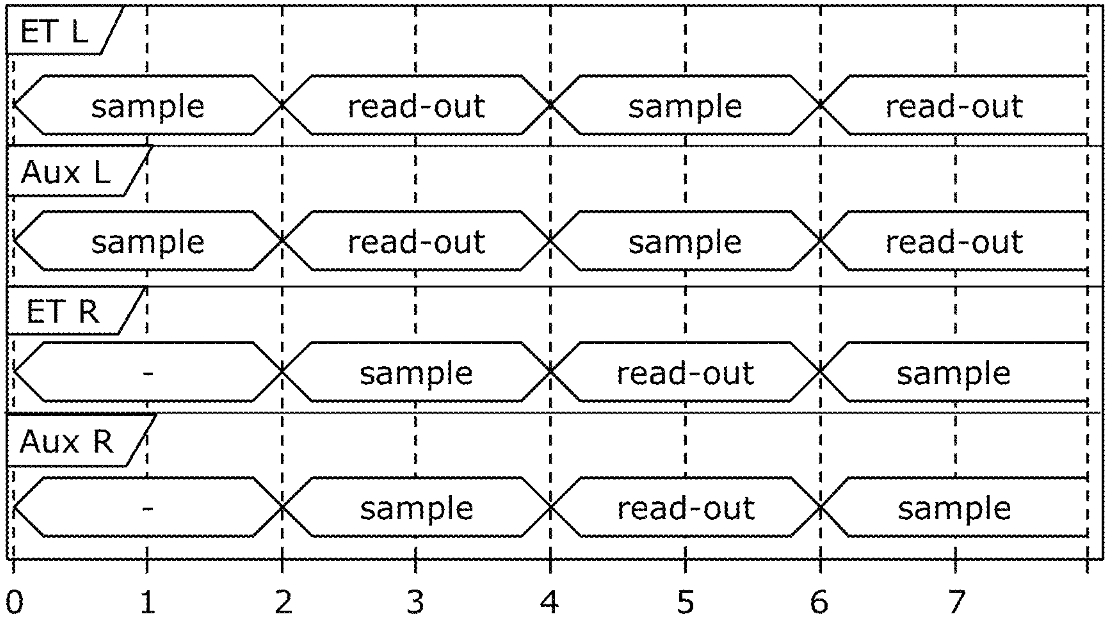
FIG. 4 depicts a timing diagram of various activities of a tracking system that are performed for a left eye and a right eye, in accordance with a first embodiment of the present disclosure.

FIG. 4 depicts a timing diagram of various activities of a tracking system that are performed for a left eye and a right eye, in accordance with a first embodiment of the present disclosure. In the timing diagram, units of time are marked on an x-axis. Activities of a left eye-tracker are shown in a row marked ET L, while activities of a right eye-tracker are shown in another row marked ET R. Activities of at least one left auxiliary sensor are shown in a row marked Aux L, while activities of at least one right auxiliary sensor are shown in another row marked Aux R.

FIG. 4 pertains to a high/medium charge level condition (namely, Case 1). Accordingly, when it is detected that a charge level of at least one rechargeable power source of a tracking system is above a first predefined threshold level, left sensor data is read out from at least one left auxiliary sensor by allowing communication between at least one left auxiliary sensor and a left communication bus, during a time period when right eye-tracking data is being sampled; and right sensor data is read out from at least one right auxiliary sensor by allowing communication between at least one right auxiliary sensor and a right communication bus, during another time period when left eye-tracking data is being sampled.

In other words, the sensor data is read out from the auxiliary sensor(s) of the given eye when the eye-tracking data of another eye is being sampled. This does not cause any noise to the eye-tracking data of the other eye. Moreover, as the sampling of the eye-tracking data for the left eye and the right eye is performed in a time-multiplexed manner, the sensor data of the auxiliary sensor(s) of the given eye is read out when the eye-tracking data of the same eye is not being sampled. As shown in FIG. 4, the sensor data of the auxiliary sensor(s) of the given eye is read out when the eye-tracking data of the same eye is being read out. As a result, there is no noise in the eye-tracking data of the given eye (namely, the same eye) also.

Figure 5:
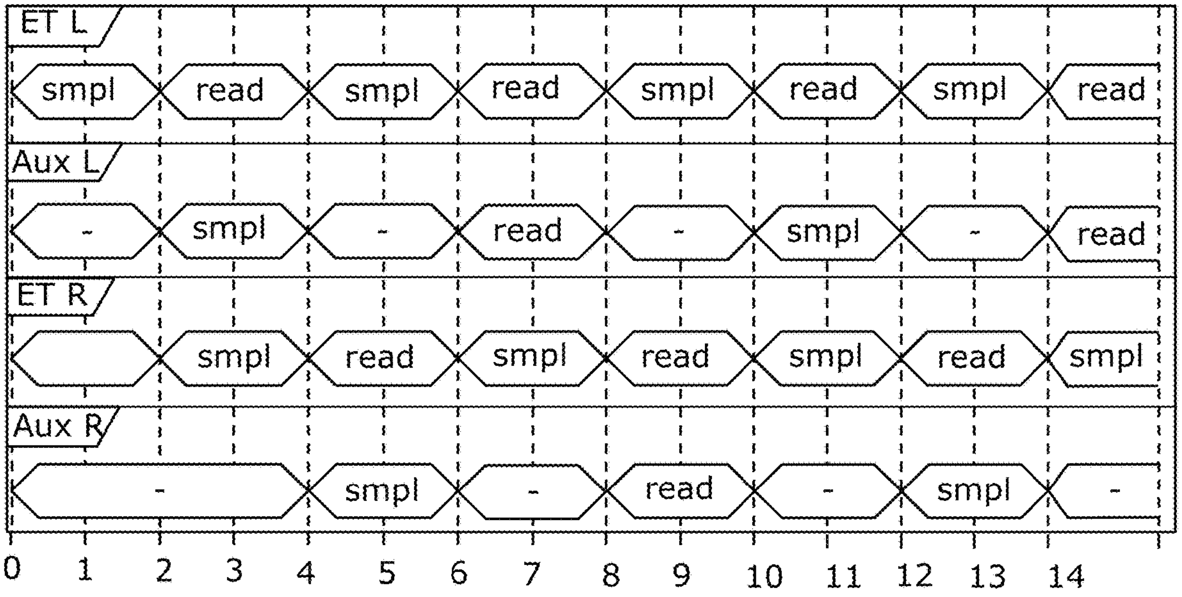
FIG. 5 depicts a timing diagram of various activities of a tracking system that are performed for the left eye and the right eye, in accordance with a second embodiment and a third embodiment of the present disclosure.

FIG. 5 depicts a timing diagram of various activities of a tracking system that are performed for the left eye and the right eye, in accordance with a second embodiment and a third embodiment of the present disclosure. In the timing diagram, units of time are marked on an x-axis. Activities of a left eye-tracker are shown in a row marked ET L, while activities of a right eye-tracker are shown in another row marked ET R. Activities of at least one left auxiliary sensor are shown in a row marked Aux L, while activities of at least one right auxiliary sensor are shown in another row marked Aux R.

According to the second embodiment, FIG. 5 pertains to a low charge level condition (namely, Case 2). Accordingly, when it is detected that the charge level of the at least one rechargeable power source is any one of: (i) not above the first predefined threshold level, (ii) below the second predefined threshold level left sensor data is read out from the at least one left auxiliary sensor by allowing communication between the at least one left auxiliary sensor and the left communication bus, during every $M^{th}$ cycle of sampling of the right eye-tracking data; and right sensor data is read out from the at least one right auxiliary sensor by allowing communication between the at least one right auxiliary sensor and the right communication bus, during every $N^{th}$ cycle of sampling of the left eye-tracking data.

This allows to reduce power consumption of the auxiliary sensor(s), thereby allowing the tracking system to utilise the remaining charge of the at least one rechargeable power source to focus on high priority tasks, such as eye-tracking. Moreover, by reducing the frequency of activities performed by the auxiliary sensor(s) and performing lesser number of activities in parallel, voltage fluctuations can be prevented during the low charge level condition. With reference to FIG. 5, M and N are shown to be equal to 2. However, it will be appreciated that M and N can be much higher than 2, and for certain types of sensors be even as high as hundreds.

According to the third embodiment, FIG. 5 pertains to a hot/cold ambient condition (namely, Case 3). Accordingly, when it is detected that the ambient temperature is any one of: (i) more than the first predefined threshold temperature, (ii) below the second predefined threshold temperature, left sensor data is read out from the at least one left auxiliary sensor by allowing communication between the at least one left auxiliary sensor and the left communication bus, during every $K^{th}$ cycle of sampling of the right eye-tracking data; and right sensor data is read out from the at least one right auxiliary sensor by allowing communication between the at least one right auxiliary sensor and the right communication bus, during every $L^{th}$ cycle of sampling of the left eye-tracking data.

This allows to reduce power consumption of the auxiliary sensor(s), thereby allowing the tracking system to utilise the remaining charge of the at least one rechargeable power source to focus on high priority tasks, such as eye-tracking, during the hot/cold ambient condition. Moreover, by reducing the frequency of activities performed by the auxiliary sensor(s) and performing lesser number of activities in parallel, voltage fluctuations can be prevented during the hot/cold ambient condition. With reference to FIG. 5, K and L are shown to be equal to 2. However, it will be appreciated that K and L can be much higher than 2, and for certain types of auxiliary sensors be even as high as hundreds.

FIGS. 4 and 5 are merely examples, which should not unduly limit the scope of the claims herein. A person skilled in the art will recognize many variations, alternatives, and modifications of embodiments of the present disclosure.

Figure 6:
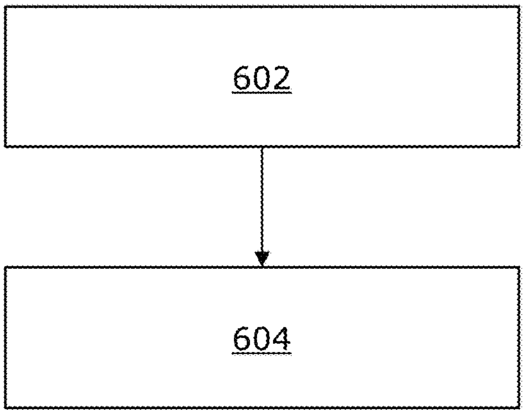
FIG. 6. illustrates a flowchart depicting steps of a method incorporating aspects of the disclosed embodiments.

Referring to FIG. 6, illustrated is a flowchart depicting steps of a method implemented by a tracking system comprising a left eye-tracker and a right eye-tracker, at least one left auxiliary sensor and at least one right auxiliary sensor, a processor, a left communication bus communicably coupling the processor to the at least one left auxiliary sensor, and a right communication bus communicably coupling the processor to the at least one right auxiliary sensor, wherein each of the left eye-tracker and the right eye-tracker comprises a plurality of light emitters, a plurality of light sensors and an analog front end (AFE) chip, wherein the plurality of light emitters are implemented as infrared (IR) emitters, while the plurality of light sensors are implemented as IR sensors, and wherein the at least one left auxiliary sensor and the at least one right auxiliary sensor are peripheral sensors. At step 602, communication between the at least one left auxiliary sensor and the left communication bus is temporarily disabled, whilst sampling left eye-tracking data using the left eye-tracker. At step 604, communication between the at least one right auxiliary sensor and the right communication bus is temporarily disabled, whilst sampling right eye-tracking data using the right eye-tracker.

The aforementioned steps are only illustrative and other alternatives can also be provided where one or more steps are added, one or more steps are removed, or one or more steps are provided in a different sequence without departing from the scope of the claims herein.

The invention claimed is:

1. A tracking system for an adaptive eyeglass, the tracking system comprising:

a left eye-tracker and a right eye-tracker for a left part and a right part of the adaptive eyeglass, respectively, wherein each of the left eye-tracker and the right eye-tracker comprises a plurality of light emitters, a plurality of light sensors and an analog front end (AFE) chip, wherein the plurality of light emitters are implemented as infrared (IR) emitters, while the plurality of light sensors are implemented as IR sensors;

at least one left auxiliary sensor and at least one right auxiliary sensor arranged on the left part and the right part, respectively, wherein the at least one left auxiliary sensor and the at least one right auxiliary sensor are peripheral sensors;

a processor;

a left communication bus that is employed to communicably couple the processor to the at least one left auxiliary sensor; and right communication bus that is employed to communicably couple the processor to the at least one right auxiliary sensor, wherein the processor is configured to:

temporarily disable communication between the at least one left auxiliary sensor and the left communication bus, whilst sampling left eye-tracking data using the left eye-tracker; and temporarily disable communication between the at least one right auxiliary sensor and the right communication bus, whilst sampling right eye-tracking data using the right eye-tracker.

2. The tracking system of claim 1, wherein the left eye-tracking data and the right eye-tracking data are sampled in a time-multiplexed manner.

3. The tracking system of claim 1, wherein the processor is configured to:

read out the left eye-tracking data from the left eye-tracker, during a time period when the right eye-tracking data is being sampled; and read out the right eye-tracking data from the right eye-tracker, during another time period when the left eye-tracking data is being sampled.

4. The tracking system of claim 1, further comprising at least one rechargeable power source that is employed to supply electrical power to the left eye-tracker, the right eye-tracker, the at least one left auxiliary sensor, the at least one right auxiliary sensor and the processor, wherein the processor is configured to:

detect when a charge level of the at least one rechargeable power source is above a first predefined threshold level; and when it is detected that the charge level is above the first predefined threshold level, read out left sensor data from the at least one left auxiliary sensor by allowing communication between the at least one left auxiliary sensor and the left communication bus, during a time period when the right eye-tracking data is being sampled; and read out right sensor data from the at least one right auxiliary sensor by allowing communication between the at least one right auxiliary and the right communication bus, during another time period when the left eye-tracking data is being sampled.

5. The tracking system of claim 1, further comprising at least one rechargeable power source that is employed to supply electrical power to the left eye-tracker, the right eye-tracker, the at least one left auxiliary sensor, the at least one right auxiliary sensor and the processor, wherein the processor is configured to:

detect when a charge level of the at least one rechargeable power source is any one of: (i) not above a first predefined threshold level, (ii) below a second predefined threshold level; and when it is detected that the charge level is any one of: (i) not above the first predefined threshold level, (ii) below the second predefined threshold level, read out left sensor data from the at least one left auxiliary sensor by allowing communication between the at least one left auxiliary sensor and the left communication bus, during every $M^{th}$ cycle of sampling of the right eye-tracking data, wherein M is an integer whose value is greater than or equal to 2; and read out right sensor data from the at least one right auxiliary sensor by allowing communication between the at least one right auxiliary sensor and the right communication bus, during every $N^{th}$ cycle of sampling of the left eye-tracking data, wherein N is an integer whose value is greater than or equal to 2.

6. The tracking system of claim 1, wherein at least one of: the at least one left auxiliary sensor, the at least one right auxiliary sensor comprises a temperature sensor that is employed to sense an ambient temperature, and wherein the processor is configured to:

detect when the ambient temperature is any one of: (i) more than a first predefined threshold temperature, (ii) below a second predefined threshold temperature; and when it is detected that the ambient temperature is any one of: (i) more than the first predefined threshold temperature, (ii) below the second predefined threshold temperature, read out left sensor data from the at least one left auxiliary sensor by allowing communication between the at least one left auxiliary sensor and the left communication bus, during every $K^{th}$ cycle of sampling of the right eye-tracking data, wherein K is an integer whose value is greater than or equal to 2; and read out right sensor data from the at least one right auxiliary sensor by allowing communication between the at least one right auxiliary sensor and the right communication bus, during every $L^{th}$ cycle of sampling of the left eye-tracking data, wherein L is an integer whose value is greater than or equal to 2.

7. The tracking system of claim 1, wherein at least one of: the at least one left auxiliary sensor, the at least one right auxiliary sensor comprises a temperature sensor, and at least one of: the at least one left auxiliary sensor, the at least one right auxiliary sensor comprises at least one of: an ultraviolet sensor, an ambient light sensor, wherein a given eye-tracker comprises a plurality of light emitters and a plurality of light sensors, wherein the processor is configured to:

detect at least one of: (i) when ultraviolet light intensities read out from the ultraviolet sensor are above a predefined threshold ultraviolet level, (ii) when an average illuminance read out from the ambient light sensor is above a predefined threshold illuminance; and when at least one of following is detected: (i) the ultraviolet light intensities are above the predefined threshold ultraviolet level, (ii) the average illuminance is above the predefined threshold illuminance, increase an illumination intensity of each light emitter;

decrease a sampling frequency of the temperature sensor; and increase a sampling frequency of the ultraviolet sensor.

8. A method implemented by a tracking system comprising a left eye-tracker and a right eye-tracker, at least one left auxiliary sensor and at least one right auxiliary sensor, a processor, a left communication bus communicably coupling the processor to the at least one left auxiliary sensor, and a right communication bus communicably coupling the processor to the at least one right auxiliary sensor, wherein each of the left eye-tracker and the right eye-tracker comprises a plurality of light emitters, a plurality of light sensors and an analog front end (AFE) chip, wherein the plurality of light emitters are implemented as infrared (IR) emitters, while the plurality of light sensors are implemented as IR sensors, and wherein the at least one left auxiliary sensor and the at least one right auxiliary sensor are peripheral sensors, the method comprising:

temporarily disabling communication between the at least one left auxiliary sensor and the left communication bus, whilst sampling left eye-tracking data using the left eye-tracker; and temporarily disabling communication between the at least one right auxiliary sensor and the right communication bus, whilst sampling right eye-tracking data using the right eye-tracker.

9. The method of claim 8, wherein the left eye-tracking data and the right eye-tracking data are sampled in a time-multiplexed manner.

10. The method of claim 8, further comprising:

reading out the left eye-tracking data from the left eye-tracker, during a time period when the right eye-tracking data is being sampled; and reading out the right eye-tracking data from the right eye-tracker, during another time period when the left eye-tracking data is being sampled.

11. The method of claim 8, further comprising:

detecting when a charge level of at least one rechargeable power source of the tracking system is above a first predefined threshold level; and when it is detected that the charge level is above the first predefined threshold level, reading out left sensor data from the at least one left auxiliary sensor by allowing communication between the at least one left auxiliary sensor and the left communication bus, during a time period when the right eye-tracking data is being sampled; and reading out right sensor data from the at least one right auxiliary sensor by allowing communication between the at least one right auxiliary sensor and the right communication bus, during another time period when the left eye-tracking data is being sampled.

12. The method of claim 8, further comprising:

detecting when a charge level of at least one rechargeable power source of the tracking system is any one of: (i) not above a first predefined threshold level, (ii) below a second predefined threshold level; and when it is detected that the charge level is any one of: (i) not above the first predefined threshold level, (ii) below the second predefined threshold level, reading out left sensor data from the at least one left auxiliary sensor by allowing communication between the at least one left auxiliary sensor and the left communication bus, during every $M^{th}$ cycle of sampling of the right eye-tracking data, wherein M is an integer whose value is greater than or equal to 2; and reading out right sensor data from the at least one right auxiliary sensor by allowing communication between the at least one right auxiliary sensor and the right communication bus, during every $N^{th}$ cycle of sampling of the left eye-tracking data, wherein N is an integer whose value is greater than or equal to 2.

13. The method of claim 8, further comprising:

detecting when an ambient temperature of the tracking system is any one of: (i) more than a first predefined threshold temperature, (ii) below a second predefined threshold temperature; and when it is detected that the ambient temperature is any one of: (i) more than the first predefined threshold temperature, (ii) below the second predefined threshold temperature, reading out left sensor data from the at least one left auxiliary sensor by allowing communication between the at least one left auxiliary sensor and the left communication bus, during every $K^{th}$ cycle of sampling of the right eye-tracking data, wherein K is an integer whose value is greater than or equal to 2; and reading out right sensor data from the at least one right auxiliary sensor by allowing communication between the at least one right auxiliary sensor and the right communication bus, during every $L^{th}$ cycle of sampling of the left eye-tracking data, wherein L is an integer whose value is greater than or equal to 2.

14. The method of claim 8, wherein a given eye-tracker comprises a plurality of light emitters and a plurality of light sensors, the method further comprising:

detecting at least one of: (i) when ultraviolet light intensities read out from an ultraviolet sensor of the tracking system are above a predefined threshold ultraviolet level, (ii) when an average illuminance read out from an ambient light sensor of the tracking system is above a predefined threshold illuminance; and when at least one of following is detected: (i) the ultraviolet light intensities are above the predefined threshold ultraviolet level, (ii) the average illuminance is above the predefined threshold illuminance, increasing an illumination intensity of each light emitter;

decreasing a sampling frequency of a temperature sensor of the tracking system; and increasing a sampling frequency of the ultraviolet sensor.

* * * * *